United States Patent
Elvebakken et al.

(12)

(10) Patent No.: US 11,053,944 B2
(45) Date of Patent: Jul. 6, 2021

(54) SUBSEA BARRIER FLUID SYSTEM

(71) Applicant: Aker Solutions AS, Lysaker (NO)

(72) Inventors: Dag Elvebakken, Heggedal (NO); Tarjei Thorrud Larsen, Drammen (NO)

(73) Assignee: Aker Solutions AS, Lysaker (NO)

( * ) Notice: Subject to any disclaimer, the term of this patent is extended or adjusted under 35 U.S.C. 154(b) by 468 days.

(21) Appl. No.: 15/752,771

(22) PCT Filed: Oct. 14, 2016

(86) PCT No.: PCT/EP2016/074755
§ 371 (c)(1),
(2) Date: Feb. 14, 2018

(87) PCT Pub. No.: WO2017/064274
PCT Pub. Date: Apr. 20, 2017

(65) Prior Publication Data
US 2018/0231005 A1    Aug. 16, 2018

(30) Foreign Application Priority Data

Oct. 15, 2015  (NO) .................................. 20151403

(51) Int. Cl.
*F04D 13/06*    (2006.01)
*F04D 13/08*    (2006.01)
(Continued)

(52) U.S. Cl.
CPC ........ *F04D 13/062* (2013.01); *E21B 33/0355* (2013.01); *E21B 41/0007* (2013.01);
(Continued)

(58) Field of Classification Search
CPC .. F04D 13/062; F04D 13/086; F04D 25/0686; F04D 29/104; F04D 29/108;
(Continued)

(56) References Cited

U.S. PATENT DOCUMENTS 5,636,847 A    6/1997 Ostrowski
5,769,427 A    6/1998 Ostrowski
(Continued)

FOREIGN PATENT DOCUMENTS

NO            333696 B1    8/2013
WO    WO-2011161517 A1   12/2011
(Continued)

OTHER PUBLICATIONS

Strømmen, Henrik, "International Search Report," prepared for PCT/EP2016/074755, dated Dec. 13, 2016, four pages.

*Primary Examiner* — Charles G Freay
*Assistant Examiner* — Lilya Pekarskaya
(74) *Attorney, Agent, or Firm* — Shackelford, Bowen, McKinley & Norton, LLP

(57) ABSTRACT

The invention provides an autonomous subsea barrier fluid system for a subsea pressure booster, the subsea pressure booster comprising a process fluid compartment, a motor compartment and a rotor assembly extending from the motor compartment into the process fluid compartment with one or several shaft seals separating the process fluid from the barrier fluid in the motor compartment. The subsea barrier fluid system is distinguished in that it comprises: a subsea barrier fluid pump, a barrier fluid delivery line, arranged between the barrier fluid pump and the motor compartment, a pressure controlled regulator, operatively arranged to at least one of the barrier fluid delivery line and the subsea barrier fluid pump, a subsea barrier fluid storage, and a barrier fluid suction line arranged from the subsea barrier fluid storage to the subsea barrier fluid pump.

7 Claims, 5 Drawing Sheets

(51) Int. Cl.
*F04D 25/06* (2006.01)
*F04D 29/10* (2006.01)
*E21B 41/00* (2006.01)
*E21B 33/035* (2006.01)
*E21B 43/01* (2006.01)
*E21B 43/12* (2006.01)
*F16N 17/00* (2006.01)
*F04C 13/00* (2006.01)

(52) U.S. Cl.
CPC ............ *E21B 43/01* (2013.01); *E21B 43/121* (2013.01); *F04D 13/086* (2013.01); *F04D 25/0686* (2013.01); *F04D 29/104* (2013.01); *F04D 29/108* (2013.01); *F04C 13/008* (2013.01); *F16N 17/00* (2013.01)

(58) Field of Classification Search
CPC .......... F04D 13/08; F04D 15/00; F04D 27/00; E21B 33/0355; E21B 43/01; E21B 43/121; F04C 13/008; F04B 49/00
See application file for complete search history.

(56) References Cited

U.S. PATENT DOCUMENTS

| | | |
|---|---|---|
| 6,059,539 A | 5/2000 | Nyilas et al. |
| 2011/0052432 A1 | 3/2011 | Cunningham et al. |
| 2012/0027564 A1 | 2/2012 | Felix |
| 2013/0136634 A1 | 5/2013 | Saele |
| 2013/0146299 A1 | 6/2013 | Tomter |
| 2013/0167962 A1* | 7/2013 | Skjetne ............... E21B 41/0007 138/30 |
| 2013/0213660 A1* | 8/2013 | Misuraca .............. E21B 33/064 166/339 |
| 2014/0241907 A1* | 8/2014 | Grynning .............. F04B 49/007 417/53 |
| 2015/0068606 A1* | 3/2015 | Ottestad ................... F04B 5/02 137/1 |
| 2015/0285036 A1 | 10/2015 | Theron et al. |
| 2015/0316162 A1* | 11/2015 | Ottestad .............. F04D 25/0686 137/488 |
| 2016/0341209 A1* | 11/2016 | Landi .................... F04D 29/108 |

FOREIGN PATENT DOCUMENTS

| | | |
|---|---|---|
| WO | WO-2013110979 A2 | 8/2013 |
| WO | WO-2014092581 A1 | 6/2014 |
| WO | WO-2014172324 A1 | 10/2014 |
| WO | WO-2015097502 A1 | 7/2015 |

* cited by examiner

Figure 1:
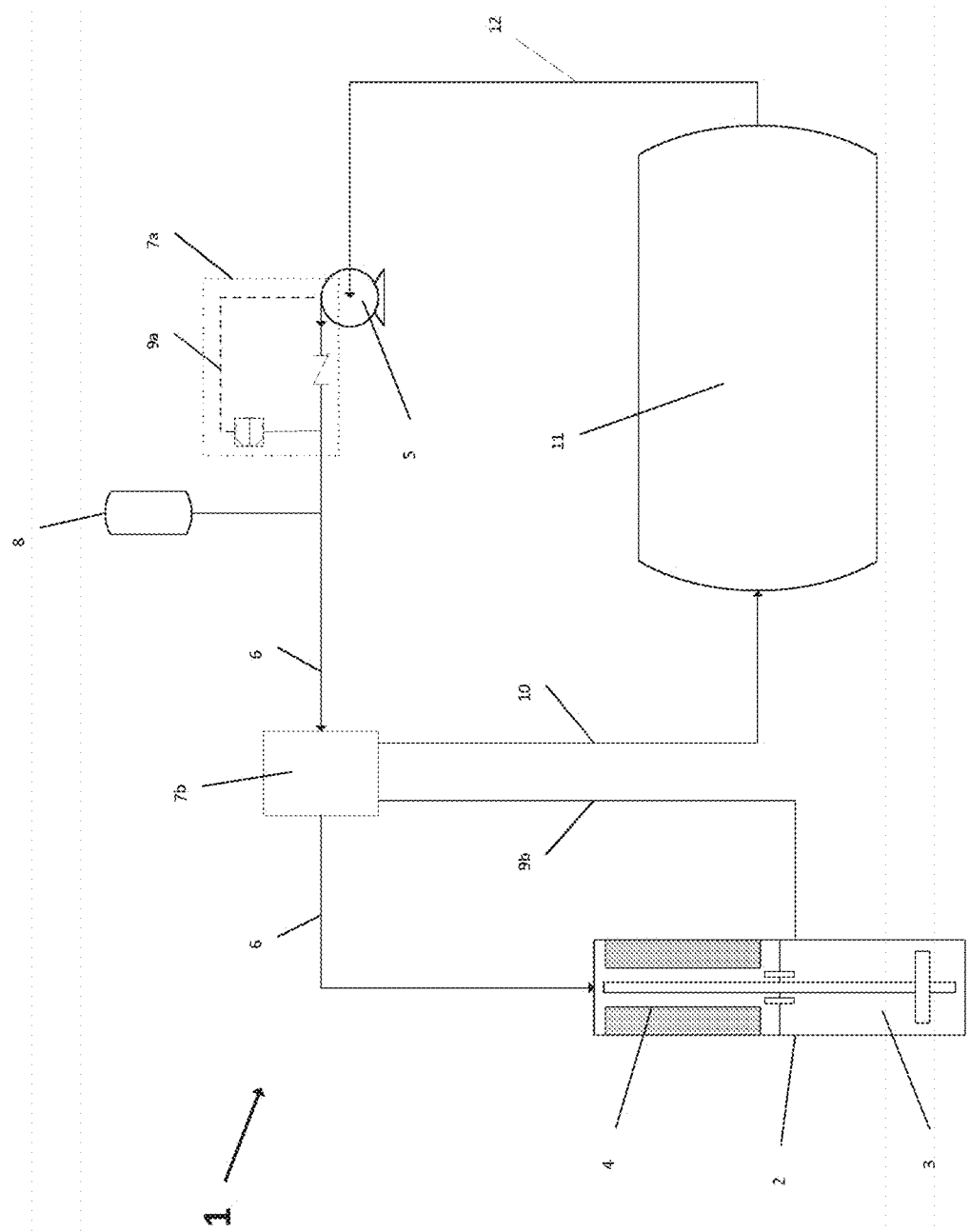

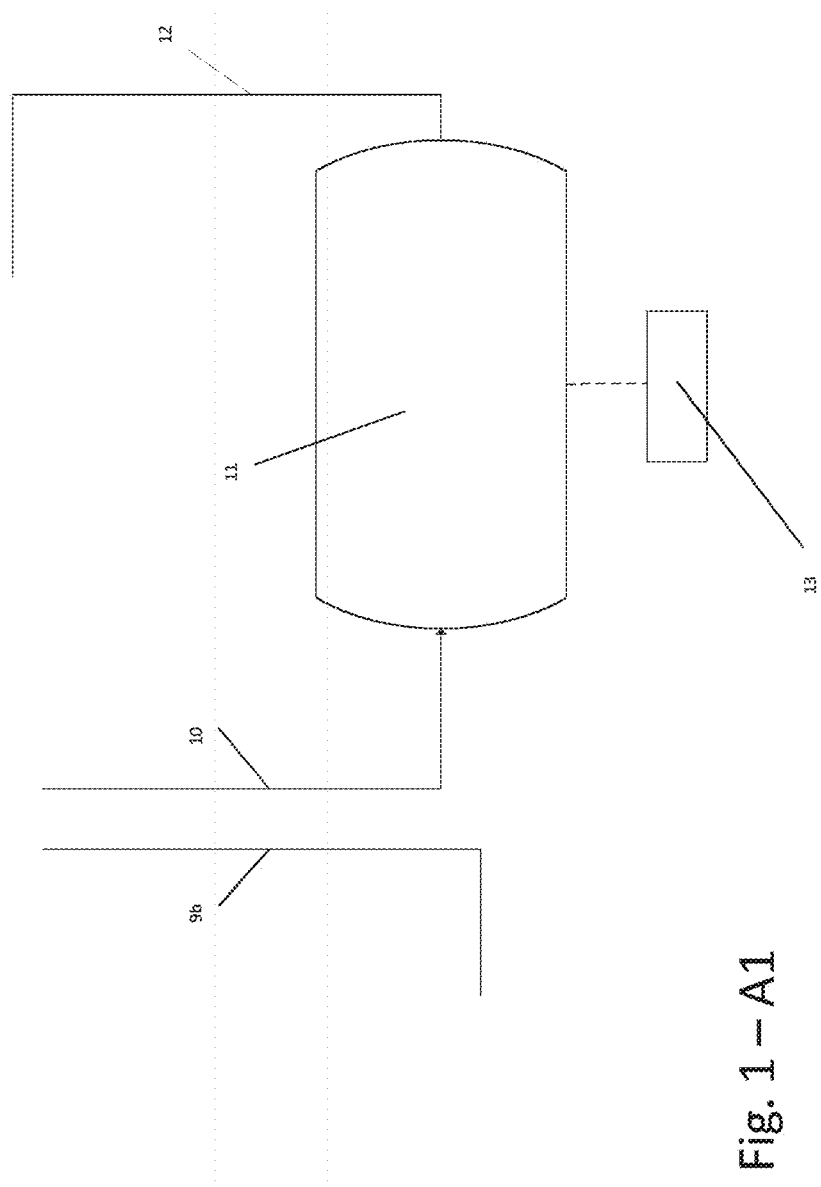
Fig. 1 – A1

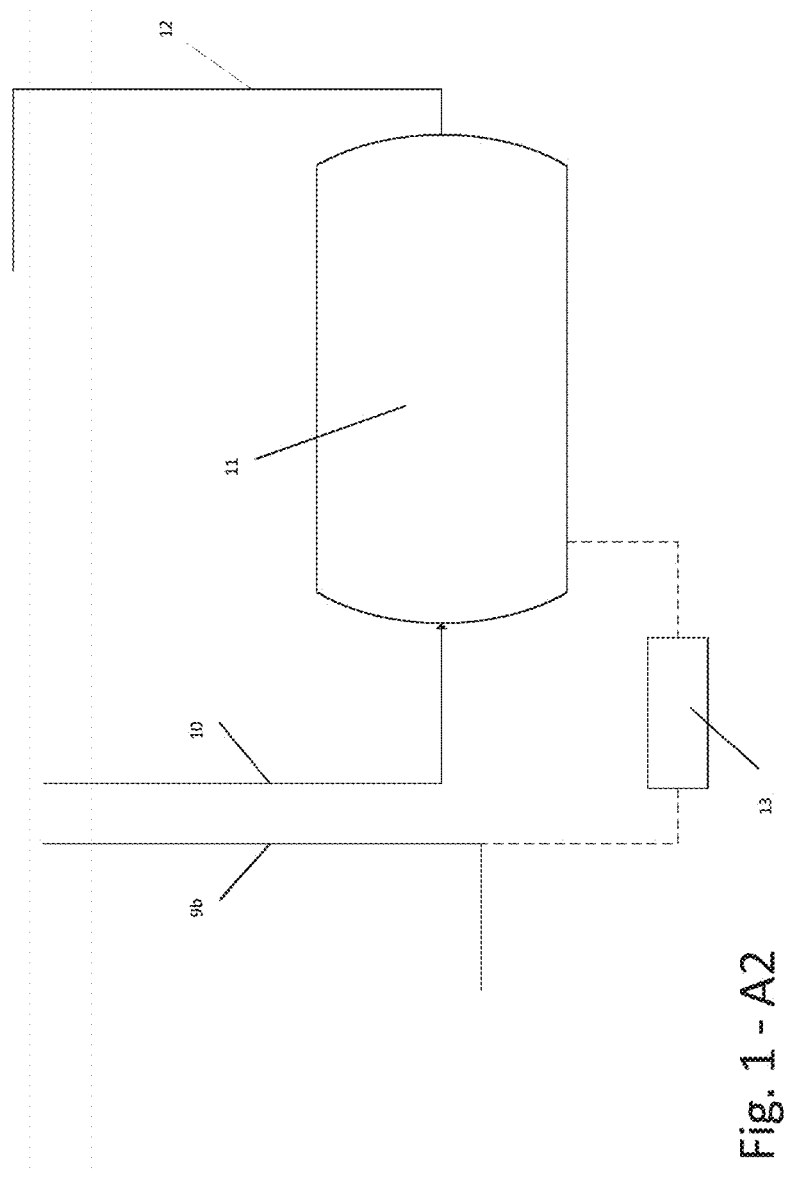
Fig. 1 - A2

Figure 2:
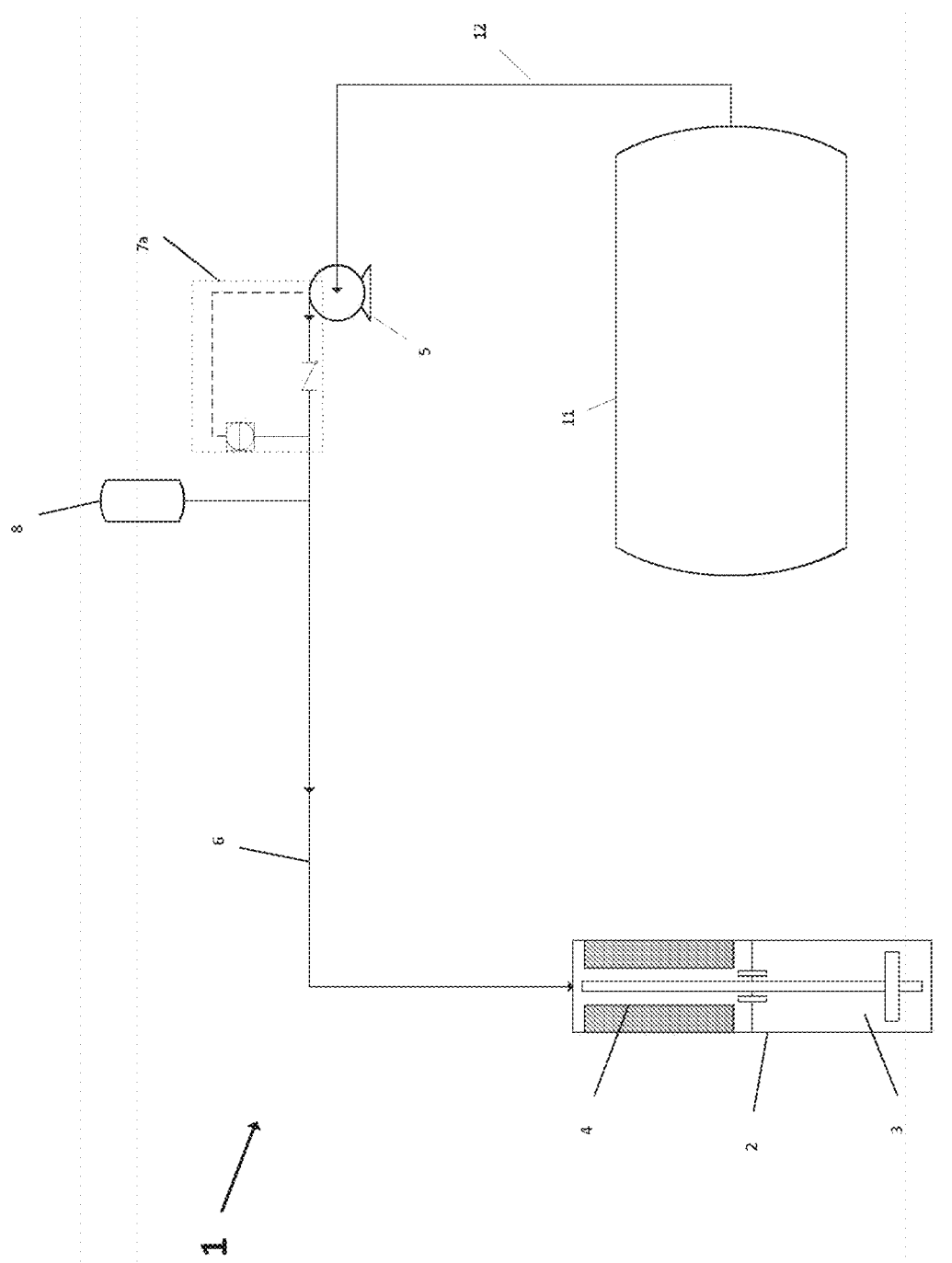

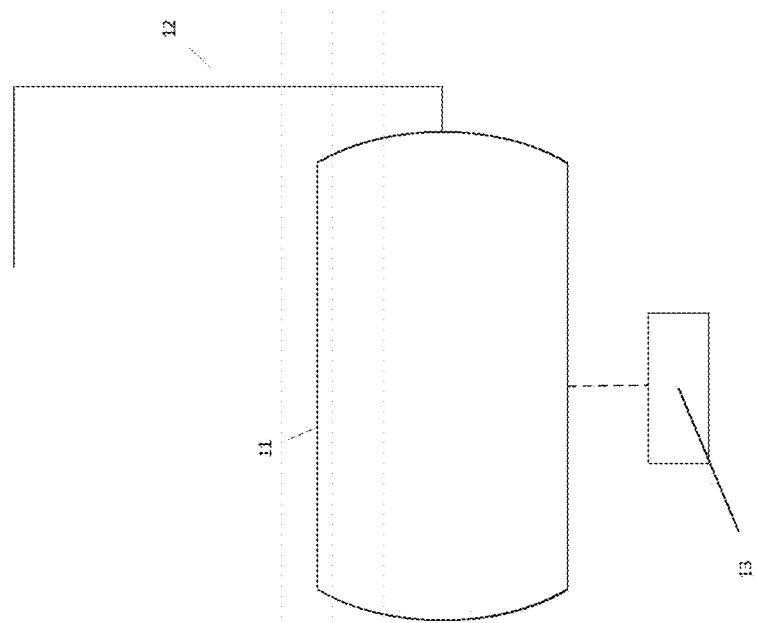
Fig. 2 - A1

SUBSEA BARRIER FLUID SYSTEM

FIELD OF THE INVENTION

The present invention relates to an auxiliary system for subsea pressure boosters for the petroleum industry, for subsea pumping or compressing petroleum liquids and gases or injecting water. A subsea pressure booster is a subsea pump, a subsea multiphase pump or a subsea compressor.

BACKGROUND OF THE INVENTION AND PRIOR ART

For subsea pressure boosters reliability is vital, since failures have severe consequences compared to failures of pressure boosters topsides or onshore.

The typical components that fail are bearings and seals. In addition, the motor can fail if process fluid contaminates motor compartment.

A vital part of subsea pressure boosters is the barrier fluid system, which lubricate, cools, cleans the bearings and seals, and maintain an overpressure in the motor compartment compared to the pressure booster process side, thus eliminating ingress of contaminating process fluid into the motor compartment. Barrier fluid is consumed by controlled leakage, over the shaft seal(s), from a pressure booster motor compartment to a pressure booster process compartment. For most systems, barrier fluid will also be consumed at higher flow due to the need for regulation to maintain the overpressure in the motor compartment. This regulation cycle includes pressure controlled dumping of barrier fluid from the motor into the process flow thus rendering it unavailable for further use. While consumption from leakage over the shaft seals are low rate and predictable, consumption from dumping is generally considerably higher and much more difficult to predict.

Several systems for regulation of barrier fluid overpressure exist, relying on purely autonomous mechanical pressure controllers, electromechanical pressure controllers or other means for pressure control, in addition to a topsides hydraulic power unit (HPU) and barrier fluid supply via an umbilical.

A demand exists for barrier fluid systems eliminating both the requirement for topsides barrier fluid supply via an umbilical and the requirement of a topsides HPU.

SUMMARY OF THE INVENTION

The demand is met with the present invention.

More specifically, The invention provides an autonomous subsea barrier fluid system for a subsea pressure booster, the subsea pressure booster comprising a process fluid compartment, a motor compartment and a rotor assembly extending from the motor compartment into the process fluid compartment with one or several shaft seals separating the process fluid from the barrier fluid in the motor compartment. The subsea barrier fluid system is distinguished in that it comprises:
  a subsea barrier fluid pump,
  a barrier fluid delivery line, arranged between the barrier fluid pump and the motor compartment,
  a pressure controlled regulator, operatively arranged to at least one of the barrier fluid delivery line and the subsea barrier fluid pump,
  a subsea barrier fluid storage, and
  a barrier fluid suction line arranged from the subsea barrier fluid storage to the subsea barrier fluid pump.

For embodiments where the process fluid pressure close to the shaft seals can show larger variations (typically greater than the capacity of the mechanical seals alone), the system further comprises:
  a reference pressure line or device, operatively arranged between the subsea pressure booster process fluid compartment and the pressure controlled regulator,
  a barrier fluid return line, coupled to the pressure controlled regulator or the barrier fluid delivery line, and
  the subsea barrier fluid storage is coupled to receive barrier fluid from the barrier fluid return line.

Accordingly, the system is merely consisting of subsea barrier fluid equipment, without topsides equipment for barrier fluid supply and without a barrier fluid delivery bore or line in an umbilical from topsides to the subsea barrier fluid system, or a separate barrier fluid supply line from topsides, meaning that said system is autonomous.

With the system of the invention, there is no barrier fluid dump line or flow path to the subsea pressure booster, so that the barrier fluid is not lost by being pumped away.

The subsea barrier fluid storage preferably comprises a pressure housing.

The subsea barrier fluid storage preferably comprises a pressure compensation system.

The barrier fluid preferably is supplied to the motor compartment of the subsea pressure booster and returned to the nearby subsea barrier fluid storage, eliminating the requirement of external barrier fluid supply.

Preferably, the pressure controlled regulator is a modified PVR (Pressure Volume Regulator). International patent publication WO 2014092581 A1 contains detailed information on a PVR, which is a mechanical subsea pressure regulator (MSPR). A mechanical regulator can be considered more reliable than regulators requiring electrical power and control to be operable, since fewer components can fail, electrical components typically have lower reliability than mechanical components and an electrical control system blackout will not stop the mechanical subsea regulator system from being operative. For further background art, reference is made to the patent publications WO 2011161517 A1, U.S. Pat. No. 6,059,539 A and NO 333696 B1. The modification to the PVR is to add a pressure controlled barrier fluid return port opening at excessive overpressure, connecting said port to a barrier fluid return line 10 to the subsea barrier fluid storage, and preferably also including a check valve in the line 9b from the PRV to the pressure booster process compartment for sensing the pressure booster compartment pressure, the check valve closing the fluid path for barrier fluid dumping at excessive barrier fluid overpressure.

Alternatively, the pressure controlled regulator is an electromechanical device or a device controlled by electrical or optical signals corresponding to pressure in the process compartment of the subsea pressure booster.

In a preferable embodiment, the pressure controlled regulator is set to provide an overpressure in the pressure booster motor compartment over the pressure booster process fluid compartment; preferably, the overpressure is about 15 bar. However, the overpressure can be any overpressure tolerated by the equipment, such as 50 bar, 30 bar, 20 bar or 5 bar. Typically, an overpressure in the range 5-50 bar is present.

Preferably, the subsea barrier fluid storage comprises a pressure compensation arrangement. As required, the pressure compensation arrangement adjusts the pressure of the subsea barrier fluid storage to be lower than the lowest pressure in the motor compartment, thus enabling a flow of barrier fluid from motor via pressure regulator and return line to storage in all situations. Typically, the storage pressure can be equal to the lowest pressure of the process fluid compartment or the ambient subsea pressure. Said pressure compensation can conveniently be to one or both of sea or to the process fluid compartment of the subsea pressure booster, whichever is lower. Alternatively, a gas filling at pressure lower than lowest motor compartment pressure can be arranged in the storage.

In an alternative embodiment, the system comprises a separate pressure controlled return flow controller arranged in the barrier fluid delivery line and with pressure control coupling to the process fluid compartment, opening for return flow at excessive overpressure in the barrier fluid delivery line.

FIGURE

FIG. 1 illustrates an embodiment of a subsea barrier fluid system of the invention.

FIG. 1—A1 illustrates a further detail of the system illustrated on FIG. 1.

FIG. 1—A2 illustrates an alternative or additional further detail of the system illustrated on FIG. 1.

FIG. 2 illustrates a simpler embodiment of a subsea barrier fluid system of the invention.

FIG. 2—A1 illustrates a further detail of the system illustrated on FIG. 2.

DETAILED DESCRIPTION

With reference to FIG. 1, a subsea barrier fluid system 1 for a subsea pressure booster 2 is illustrated, the subsea pressure booster comprising a process fluid compartment 3 and a motor compartment 4. Further, the system comprises a subsea barrier fluid pump 5 (Subsea HPU); a barrier fluid delivery line 6, arranged between the barrier fluid pump 5 and the pressure booster motor compartment. A pressure controlled regulator 7a is operatively arranged in or to the subsea barrier fluid pump 5. A reference pressure line 9a or device is operatively arranged between the barrier fluid delivery line and the pressure controlled regulator 7a. A pressure controlled regulator 7b is operatively arranged in the barrier fluid delivery line. An accumulator bank 8 is operatively arranged to the subsea barrier fluid delivery line; a reference pressure line 9b or device is operatively arranged between the subsea pressure booster process fluid compartment and the pressure controlled regulator. A barrier fluid return line 10 is coupled to the pressure controlled regulator and a subsea barrier fluid storage 11, is arranged to return barrier fluid from the barrier fluid delivery line at excessive overpressure. A barrier fluid suction line 12 is arranged from the subsea barrier fluid storage to the subsea barrier fluid pump.

FIG. 1—A1 illustrates a further detail of the system illustrated on FIG. 1, namely a pressure compensator 13 to sea, arranged to the subsea barrier storage 11. FIG. 1—A2 illustrates an alternative or additional further detail of the system illustrated on FIG. 1, namely a pressure compensator 13 arranged between the subsea barrier fluid storage 11 and the reference pressure line 9b or the pressure booster process compartment.

Reference is made to FIG. 2, illustrating a simpler embodiment of the system of the invention, feasible for less demanding subsea pressure booster arrangements, such as water injection systems or other systems with relatively stationary pressure conditions. Identical or similar features have the same reference numerical as for FIG. 1. The simplified system illustrated on FIG. 2 has no barrier fluid return line and no reference pressure line or device 9b. In FIG. 2—A1 a pressure compensator 13 to sea is illustrated, as arranged to the subsea barrier fluid storage 11.

The invention claimed is:

1. A subsea barrier fluid system for a subsea pressure booster, the subsea pressure booster comprising a subsea pressure booster process fluid compartment, a motor compartment and a rotor assembly extending from the motor compartment into the subsea pressure booster process fluid compartment with one or several shaft seals separating a process fluid from a barrier fluid in the motor compartment, the subsea barrier fluid system comprising:
   a subsea barrier fluid pump;
   a barrier fluid delivery line that is arranged between the subsea barrier fluid pump and the motor compartment;
   a pressure-controlled regulator, wherein the pressure-controlled regulator is operatively arranged to one of:
      the barrier fluid delivery line that controls a delivery of the barrier fluid to the motor compartment; and
      the subsea barrier fluid pump;
   a subsea barrier fluid storage;
   a barrier fluid suction line arranged from the subsea barrier fluid storage to the subsea barrier fluid pump;
   wherein the subsea barrier fluid system is autonomous in that it consists merely of subsea barrier fluid equipment without topsides equipment for barrier fluid supply and without a barrier fluid delivery bore in an umbilical from topsides to the subsea barrier fluid system;
   a reference pressure line or device that controls the pressure-controlled regulator and is operatively arranged between the subsea pressure booster process fluid compartment and the pressure-controlled regulator;
   a barrier fluid return line coupled to the pressure-controlled regulator or the barrier fluid delivery line; and
   wherein the subsea barrier fluid storage is coupled to receive the barrier fluid from the barrier fluid return line.

2. The subsea barrier fluid system according to claim 1, wherein the pressure-controlled regulator is a PVR.

3. The subsea barrier fluid system according to claim 1, wherein the pressure-controlled regulator is an electromechanical device.

4. The subsea barrier fluid system according to claim 1, wherein the pressure-controlled regulator is set to provide an overpressure in the motor compartment over the subsea pressure booster process fluid compartment.

5. The subsea barrier fluid system according to claim 1, wherein the subsea barrier fluid storage comprises a pressure compensation arrangement.

6. The subsea barrier fluid system according to claim 4, wherein:
   the subsea barrier fluid storage comprises a pressure compensation arrangement, wherein the pressure compensation arrangement adjusts the pressure of the subsea barrier fluid system; and
   the pressure compensation arrangement adjusts a pressure of the subsea barrier fluid storage to be equal to the lowest pressure of the subsea pressure booster process fluid compartment or the ambient subsea pressure.

7. The subsea barrier fluid system according to claim 4, wherein the overpressure is 5-50 bar overpressure.

* * * * *